(12) United States Patent  (10) Patent No.: US 7,201,444 B2
Schimmoller et al.  (45) Date of Patent: Apr. 10, 2007

(54) CHILD CAR SEAT READING LIGHT

(75) Inventors: Nathan A. Schimmoller, Springboro, OH (US); David M. Amirault, Troy, OH (US); Eric L. Dahle, Tipp City, OH (US)

(73) Assignee: Evenflo Company, Inc., Vandalia, OH (US)

( * ) Notice: Subject to any disclaimer, the term of this patent is extended or adjusted under 35 U.S.C. 154(b) by 34 days.

(21) Appl. No.: 11/050,405

(22) Filed: Feb. 3, 2005

(65) Prior Publication Data
US 2006/0181120 A1   Aug. 17, 2006

(51) Int. Cl.
A47C 7/72 (2006.01)
A47D 1/10 (2006.01)
B60Q 1/14 (2006.01)
H05B 37/02 (2006.01)
H05B 39/04 (2006.01)

(52) U.S. Cl. .............................. 297/217.6; 297/217.3; 297/217.4; 297/250.1; 362/131; 362/488; 315/77; 315/209 R

(58) Field of Classification Search ............. 297/217.6, 297/250.1, 251, 253, 254, 255, 256, 256.1, 297/256.11, 256.12, 256.13, 256.14, 256.15, 297/256.16, 256.17, 217.4; 5/905, 940; 362/131, 488; 315/209 R, 77
See application file for complete search history.

(56) References Cited

U.S. PATENT DOCUMENTS

| 1,137,091 | A | | 4/1915 | Sclafani |
| 1,659,572 | A | | 2/1928 | Klemm |
| 1,845,401 | A | | 2/1932 | Dietrich |
| 2,257,496 | A | | 9/1941 | Gaugler et al. |
| 2,833,502 | A | | 5/1958 | Wildeboor |
| 4,538,142 | A | * | 8/1985 | Hamilton et al. ..... 297/217.4 X |
| 4,979,777 | A | * | 12/1990 | Takada ..................... 297/250.1 |
| 5,083,837 | A | * | 1/1992 | Roach ................. 297/217.6 X |
| 5,147,109 | A | * | 9/1992 | Jolly ....................... 297/217.4 |
| 5,329,716 | A | * | 7/1994 | Fite ..................... 297/217.6 X |
| 5,400,230 | A | | 3/1995 | Nicoletti ..................... 362/253 |
| 5,482,352 | A | * | 1/1996 | Leal et al. ............... 297/217.4 |
| D376,662 | S | | 12/1996 | Ambrosio |
| 5,624,156 | A | * | 4/1997 | Leal et al. ............... 297/217.4 |
| 5,683,137 | A | * | 11/1997 | McDonald et al. .. 297/217.4 X |
| 5,775,771 | A | * | 7/1998 | La Cour et al. ...... 297/217.4 X |
| 5,806,924 | A | * | 9/1998 | Gonas ................. 297/250.1 X |
| 5,848,820 | A | | 12/1998 | Hecht et al. |
| 5,938,281 | A | * | 8/1999 | Keils ................... 297/217.4 X |
| 6,126,233 | A | | 10/2000 | Gaetano et al. |
| 6,164,787 | A | * | 12/2000 | Seki et al. ............. 362/131 X |
| 6,696,943 | B1 | | 2/2004 | Elrod et al. |
| 6,702,380 | B2 | * | 3/2004 | Bedard ..................... 297/250.1 |
| 6,715,830 | B2 | * | 4/2004 | Alexy ..................... 297/250.1 |

(Continued)

Primary Examiner—Rodney B. White
(74) Attorney, Agent, or Firm—Taft, Stettinius & Hollister, LLP

(57) ABSTRACT

An infant car seat comprising: (a) a seat adapted to receive an occupant; and (b) an illumination system that includes a focused light emitting source in electrical communication with a switch adapted to be in electrical communication with a power source to illuminate the focused light emitting source and downwardly directing light in front of the occupant proximate a lap region. A method of illuminating a child car seat, the method comprising the step of illuminating a seat portion of a child car seat by at least one of focusing an illumination source and orienting an illumination source to direct light downward onto the seat portion.

30 Claims, 4 Drawing Sheets

U.S. PATENT DOCUMENTS

| | | |
|---|---|---|
| 7,039,207 B1 * | 5/2006 | Elrod et al. .......... 297/217.4 X |
| 2001/0002092 A1 | 5/2001 | Reitze |
| 2001/0002169 A1 | 5/2001 | Reitze et al. |
| 2004/0052091 A1 | 3/2004 | Lee |
| 2004/0140699 A1 * | 7/2004 | Akpom ................... 297/217.4 |
| 2005/0127727 A1 * | 6/2005 | Gangadharan et al. . 297/256.16 |
| 2006/0075563 A1 * | 4/2006 | Bartner et al. .............. 5/905 X |
| 2006/0087165 A1 * | 4/2006 | Gharabegian ............ 297/217.6 |

* cited by examiner

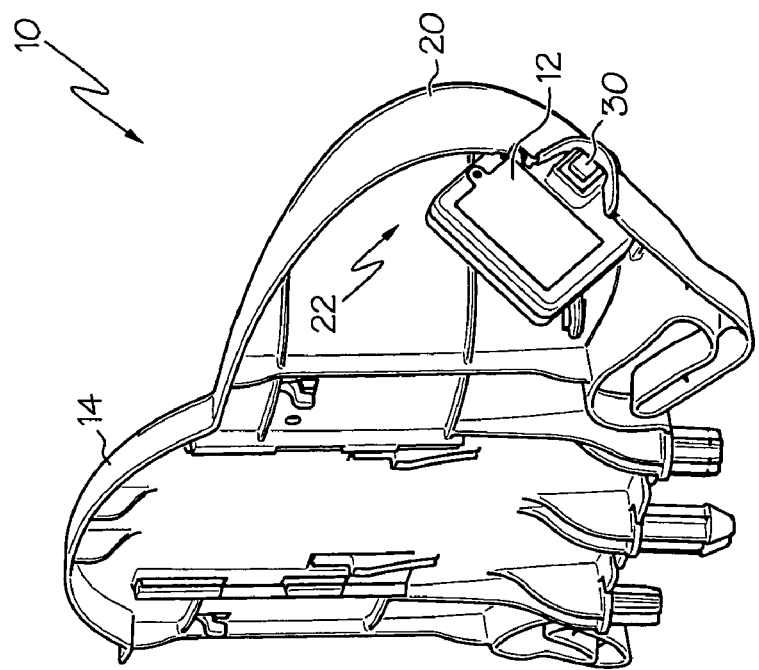
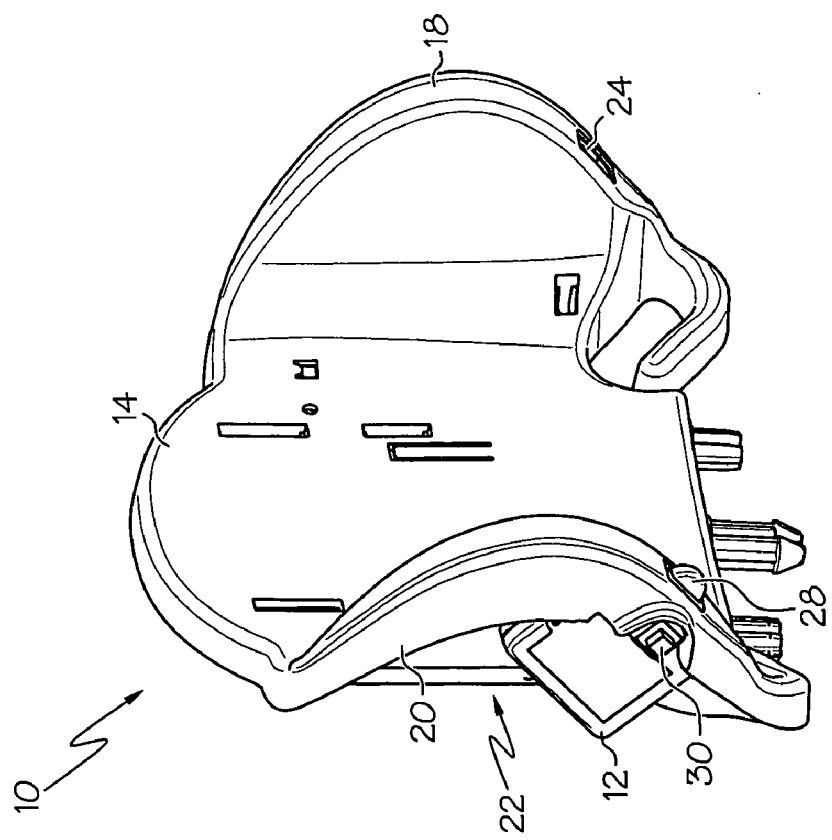

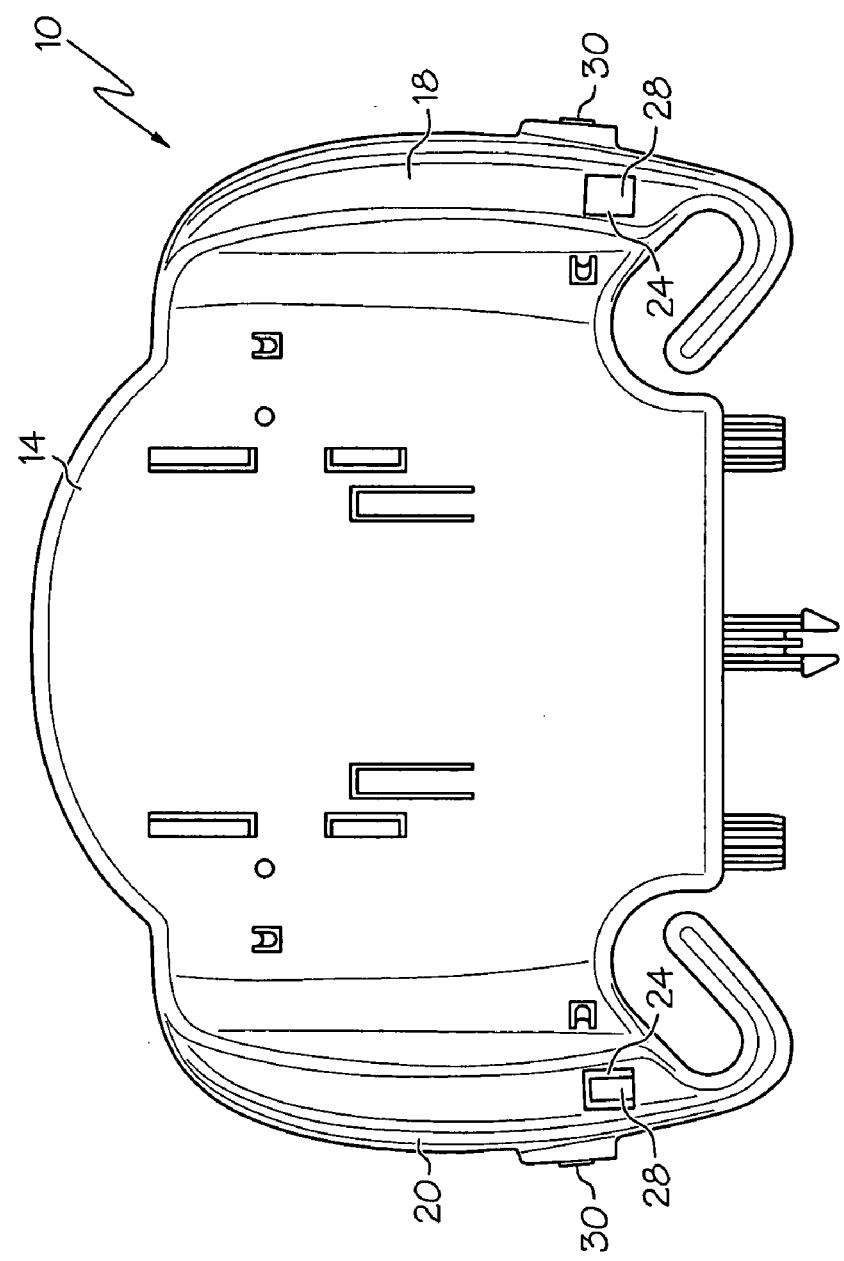
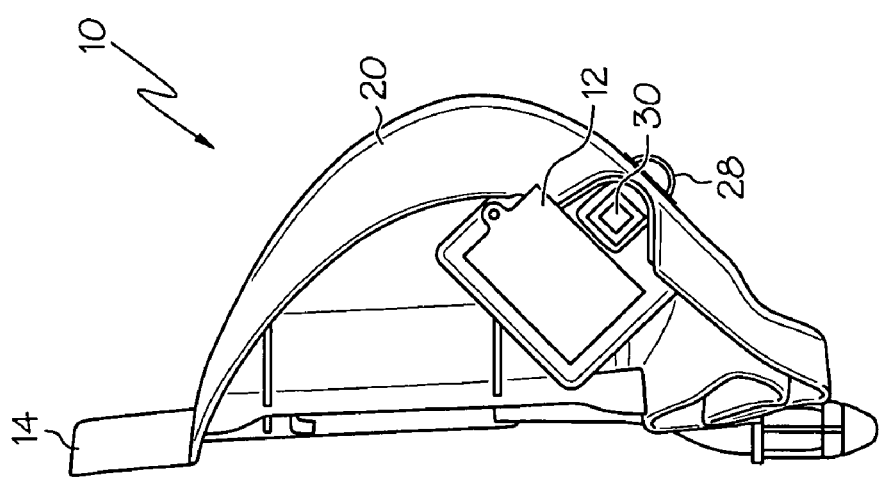

CHILD CAR SEAT READING LIGHT

BACKGROUND

1. Field of the Invention

The present invention is directed to car seat illumination systems and methods for carrying out the same and, more specifically, to car seat illumination systems illuminating areas in front of the child to enable the child to perform acts such as reading or manipulation of toys.

2. Background of the Invention

It is customary to provide a special seat in a vehicle that is adapted for younger occupants, commonly referred to as a child car seat. Various embodiments of car seats exist, some of which are adapted to be mounted to a vehicle base and/or a stroller frame. Car seats generally include straps or other retainers to maintain the general position of the occupant with respect to the car seat.

Often in low lighting situations, a care giver may be required to turn on an interior dome light of a vehicle to discern the condition of the younger occupant of the car seat. However, by turning on an interior light in the vehicle, the care giver may disturb or distract other persons in the vehicle such as the driver.

U.S. Pat. No. 6,126,233 to Gaetano et al. discloses an integral car seat illumination system that is remotely activated by the driver of the automobile. The '233 patent teaches a system and method of casting light on the child on order to monitor the child. More specifically, the '233 patent teaches utilizing multiple lights to illuminate the upper torso of a child, however, the '233 patent does not teach illuminating the lap area of a child by focusing a downwardly directed light. More importantly, the '233 patent teaches away from a system illuminating the lap of a child by focusing on monitoring the child (light in the child's face) as opposed to providing light for the child's activities (light in the child's lap). Thus, the system disclosed in the '233 patent may be undesirable for car seat occupants by having the light directed toward the head.

Therefore, there is a need for an illumination device and associated method that illuminates the lap area of a child car seat, without shining light into the face of the child.

SUMMARY OF THE INVENTION

The present invention is directed to car seat illumination systems and methods for carrying out the same and, more specifically, to car seat illumination systems having focused light sources that enable car seat occupants to view activities directly in front of them, without necessarily directing the light toward the occupant's head.

The present invention makes use of illumination devices selectively positioned and configured to selectively illuminate portions of a child seat and a child positioned within the seat. The exemplary embodiments of the present invention improve over the prior art by directing light to predetermined areas in front of the child. In a further detailed exemplary embodiment, the invention may include one or more sensors coupled to one or more switches for selectively powering the illumination source. Examples include illuminating the child car seat for a predetermined period, having the illumination source dim over a predetermined period, illuminating the child car seat when the car seat is occupied, illuminating the child car seat when motion within the seat is detected, and providing multiple illumination sources in single location to provide multiple degrees of illumination intensity. Other aspects of the present invention are discussed in the description below and reference is had thereto for a more encompassing summary.

BRIEF DESCRIPTION OF THE DRAWINGS

FIG. 1 is a right-hand side prospective view from the front of an exemplary back support in accordance with the present invention;

FIG. 2 is a right-hand side prospective view from the rear of the exemplary back support of FIG. 1;

FIG. 3 is a right-hand side profile view of the exemplary back support of FIG. 1;

FIG. 4 is a frontal view of the exemplary back support of FIG. 1;

DETAILED DESCRIPTION

Figure 6:
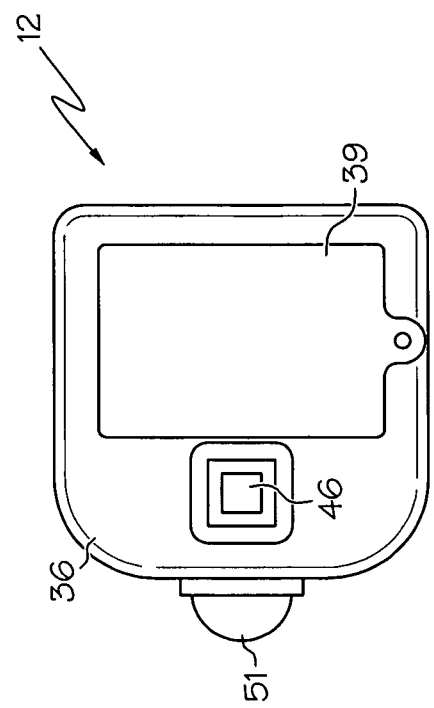
FIG. 6 is an overhead view of the exemplary illumination device of FIG. 5.

The exemplary embodiments of the present invention are described and illustrated below to encompass systems and methods for illuminating selected portions of a child seat and consequently a child positioned therein. Of course, it will be apparent to those of ordinary skill in the art that the preferred embodiment discussed below is exemplary in nature and may be reconfigured without departing from the scope and spirit of the present invention. However, for clarity and precision, the exemplary embodiments may include one or more optional features that one of ordinary skill may recognize as not being a requisite to fall within the scope of the present invention.

Referencing FIGS. 1–4, a first exemplary embodiment 10 of the present invention includes a focused illumination device 12 that may be mounted to a back support 14 of a child car seat. The back support 14 may include opposed headrests 18, 20, each headrest 18, 20 being fabricated with a pocket 22 having an orifice 24 therethrough. Each pocket 22 is adapted to receive an illumination device 12 to mount the illumination device to a respective headrest 18, 20. An illumination section 28 of each illumination device 12 is adapted to be received within the orifice 24. The pocket 22 may be fabricated to expose one or more controls 30 associated with the illumination device.

Figure 7:
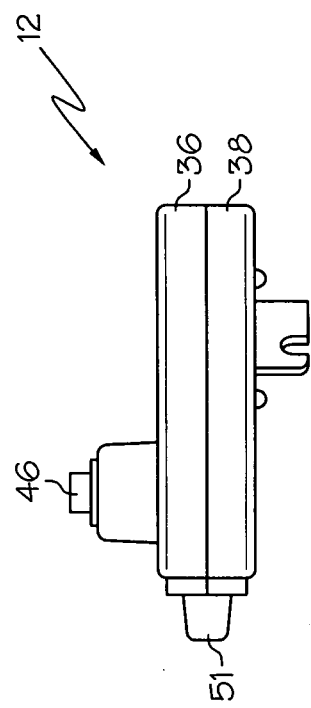
FIG. 7 is a left-hand side profile view of the illumination device of FIG. 5.
Figure 5:
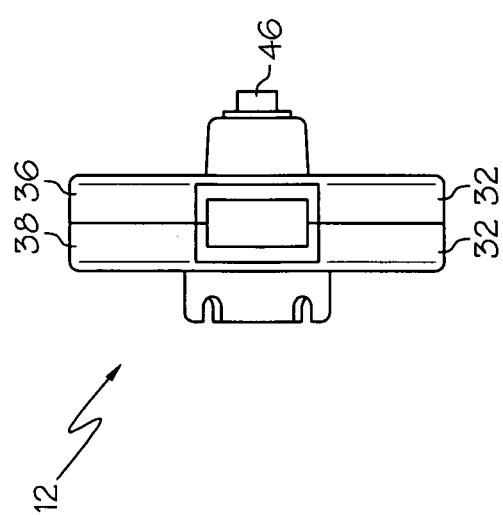
FIG. 5 is a frontal view from the front of an exemplary illumination device in accordance with the present invention.
Figure 8:
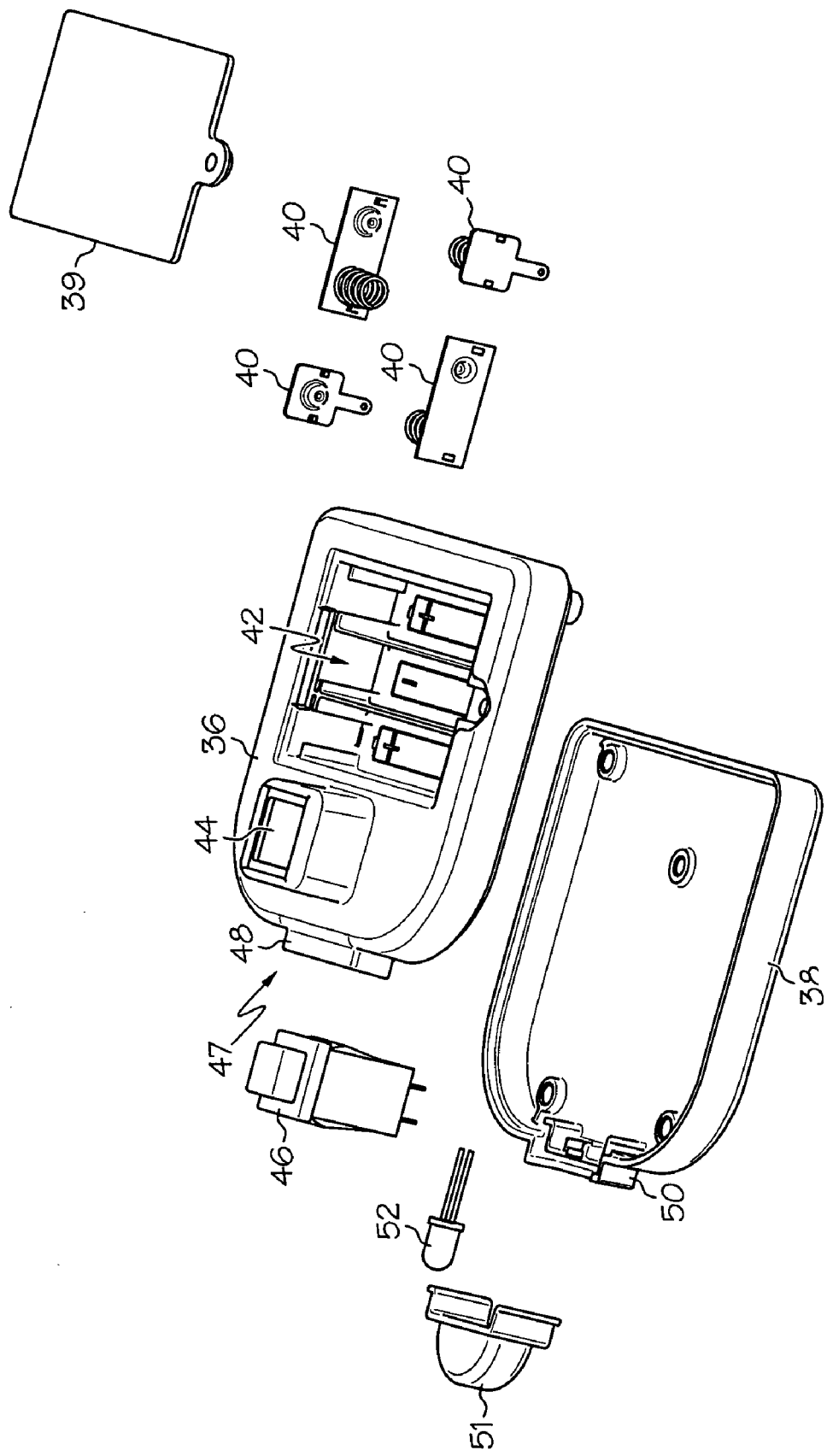
FIG. 8 is an exploded view of the illumination device of FIG. 5.

Referring to FIGS. 5–8, an exemplary illumination device 12 may include a frame 32 that includes a first frame member 36 and a second frame member 38. The first frame member 36 may also include a cover 39 that may be removably mounted to the frame member 36 using a fastener (not shown) such as, without limitation, a screw. Removal of the cover 39 exposes electrical contacts 40 adapted to contact one or more batteries (not shown) received within a bay 42. The batteries provide a source of power to the illumination device, but are not required for performance of the present invention. Other sources of electrical power that may be used with the present invention include DC power from an automotive battery or a generator, such as, without limitation, an alternator. Exemplary connections to such power sources include conventional cigarette lighters and DC-to-AC converters where two prong plugs may be used.

In addition, the present invention may be used with solar arrays or other forms of renewable power.

The first frame member 36 may also include a receptacle 44 for mounting an electrical switch 46 thereto. The electrical switch 46 may include various types of sensors and/or components such as, without limitation, a motions sensor, a dimmer, a timer, an optical sensor; a remote control, and an occupancy sensor. In a further detailed exemplary embodiment, the present invention includes a timer that may be set by a care giver to illuminate a portion of the car seat and child during a predetermined time, such as, two minutes after the child is buckled to the car seat.

The frame 32 may include an opening 47 formed from corresponding cut-outs 48, 50 within the first and second frame members 36, 38. A convex lens 51 may be adapted to protrude through the opening 46. The lens 51 is adapted to protect an illumination source 52. Exemplary illumination sources include, without limitation, a light emitting diode (LED), an incandescent bulb, and a halogen bulb. It is intended that at least one of the illumination source 52 and/or the lens 51 include features that focus the light produced by the illumination source 52. Exemplary light focusing features include the shape of the lens 51 and the illumination source 52, in addition to partially opaque lenses 51 and partially opaque illumination sources 52. In addition, the lens 51 and/or the illumination source 52 may be colored to provide selectively colored light, which includes light other than white light.

Electrical connections (not shown) associated with the illumination device 12 are operative to provide selective electrical communication between the power source, the electrical switch 46, and the illumination source 52.

It is also within the scope of the present invention to provide multiple pockets or mounting points for the exemplary illumination device 12. Still further, it is within the scope of the present invention to provide multiple mounting points for the exemplary illumination device 12 that would allow repositioning of the illumination device without removing the device from the car seat. An exemplary instance might include providing a lengthwise notch adapted to receive the illumination section 28 therethrough, where the illumination section 28 could be repositioned within the notch, all the while retaining the mounting of the illumination device 12 to the child car seat. It is not a requisite of the present invention that the illumination device 12 be mounted to the child car seat, nor that the illumination device be controlled with integrated controls. In other words, it is within the scope of the present invention to provide a wireless illumination device that may be remotely controlled.

It is also within the scope of the present invention to provide multiple illumination sources 52 within a single illumination device 12. Still further, it is also within the scope of the present invention to selectively activate the one or more of the illumination sources 52 to provide various intensities of light, various colors of light, and/or various focuses of light.

It is likewise within the scope of the present invention that an audible device be associated with the illumination device. Exemplary audible devices include radios, music boxes, and music players.

Following from the above description and invention summaries, it should be apparent to those of ordinary skill in the art that, while the apparatus described herein constitutes an exemplary embodiment of the present invention, the invention contained herein is not limited to this precise embodiment and changes may be made to the aforementioned embodiment without departing from the scope of the invention as defined by the claims. Additionally, it is to be understood that the invention is defined by the claims and it is not intended that any limitations or elements describing the exemplary embodiment set forth herein are to be incorporated into the interpretation of any claim element unless such limitation or element is explicitly stated. Likewise, it is to be understood that it is not necessary to meet any or all of the identified advantages or objects of the invention disclosed herein in order to fall within the scope of any one of the claims, since the invention is defined by the claims and since inherent and/or unforeseen advantages of the present invention may exist even though they may not have been explicitly discussed herein.

What is claimed is:

1. An infant car seat comprising:
a seat adapted to receive an occupant;
a back support including a pair of opposed left and right headrests; and
an illumination system that includes an illumination housing containing a power source, a light emitting source, and circuitry establishing selective electrical communication between the power source and the light emitting source, the illumination system mounted on at least one of the headrests in a downwardly directed orientation, the illumination system also including a focused light emitting source including a focusing lens in electrical communication with a switch adapted to be in electrical communication with the power source and illuminating the light emitting source and downwardly directing light in front of the occupant proximate a lap region.

2. The infant car seat of claim 1, wherein the focused light emitting source is oriented to primarily illuminate a lower region of the occupant.

3. The infant car seat of claim 1, wherein the illumination system includes a plurality of focused light emitting sources.

4. The infant car seat of claim 1, wherein the focused light emitting source is mounted to a back support of the seat and oriented to illuminate a lower region of the occupant.

5. The infant car seat of claim 1, wherein the focused light emitting source is repositionably mounted to the seat.

6. The infant car seat of claim 1, wherein the focused light source is removably mounted to the seat.

7. The infant car seat of claim 1, wherein the focused light source is adapted to be remotely mounted from the seat.

8. The infant car seat of claim 1, wherein the focused light emitting source includes at least one of a light emitting diode, an incandescent bulb, and a halogen bulb.

9. The infant car seat of claim 8, wherein the focused light emitting source emits a colored light.

10. The infant car seat of claim 1, further comprising a music player.

11. The infant car seat of claim 1, wherein the focused light emitting source is operative to provide multiple intensities of light.

12. The infant car seat of claim 1, wherein the illumination system further comprises a dimmer in electrical communication with the focused light emitting source.

13. The infant car seat of claim 1, wherein the switch is optically sensitive to light to discontinue power to the illumination system upon detecting a predetermined degree of ambient light.

14. The infant car seat of claim 1, wherein the switch is motion sensitive to discontinue power to the illumination system upon detecting a predetermined degree of motion by the occupant of the scat.

15. The infant car seat of claim 1, wherein the switch is sensitive to occupancy of the seat to discontinue power to the illumination system upon detecting an absence of the occupant from the seat.

16. The infant ear seat of claim 1, wherein the switch is integrated into the focused light emitting source.

17. The infant ear seat of claim 1, wherein the switch is integrated into the seat.

18. The infant car seat of claim 1, wherein the switch is integrated into a remote control.

19. The infant car seat of claim 18, wherein the remote control is wireless.

20. The infant car seat of claim 1, wherein the focused light emitting source includes a translucent lens.

21. The infant car seat of claim 20, wherein the lens is textured.

22. The infant car seat of claim 20, wherein the lens is colored.

23. A method of illuminating a child car seat, the method comprising the steps of:
   providing an illumination system that includes an illumination housing containing a power source, a light emitting source, and circuitry establishing selective electrical communication between the power source and the light emitting source,
   illuminating a seat portion of a child car seat by at least one of focusing an illumination source using a focusing lens and orienting an illumination source to direct light downward onto the seat portion; and
   providing a switch adapted to be in electrical communication with the power source and illuminating the light emitting source.

24. The method of claim 23, wherein the illumination source is focused on the seat portion.

25. The method of claim 23, wherein the illumination source is oriented in proximity to the seat portion.

26. The method of claim 23, wherein the illuminating step includes the step of providing electrical communication with a power source, where the power source includes at least one of a battery, an alternator, and a solar array.

27. The method of claim 26, wherein electrical communication step includes at least one of:
   the step of mounting a plug to a receiver, where the receiver is associated with a vehicle and the plug is associated with the child car seat; and
   the step of mounting a plug to a receiver, where the receiver is associated with the child ear seat and the plug is associated with a vehicle.

28. The method of claim 26, wherein the step of providing electrical communication with the power source includes at least one of:
   toggling a lens of the illumination source;
   utilizing a dimmer switch;
   utilizing a timer in electrical communication with the electrical switch;
   utilizing a motion sensor in electrical communication with an electrical switch;
   utilizing an optical sensor in electrical communication with an electrical switch;
   utilizing a remote control; and utilizing a child car seat occupancy sensor in electrical communication with an electrical switch.

29. The method of claim 23, wherein the illumination source is at least one of:
   integrated into the child car seat;
   removably mounted to the child car seat; and
   repositionably mounted to the child car seat.

30. The infant car seat of claim 1, wherein the illumination system further includes a timer operative to selectively discontinue electrical communication between the power source and the focused light emitting source.

* * * * *